US012515180B2

(12) United States Patent
Williams

(10) Patent No.: US 12,515,180 B2
(45) Date of Patent: Jan. 6, 2026

(54) USING A CHEMICAL INJECTION SYSTEM FOR PROCARE PROFESSIONAL SPRAY EQUIPMENT

(71) Applicant: Henry Williams, Angier, NC (US)

(72) Inventor: Henry Williams, Angier, NC (US)

( * ) Notice: Subject to any disclaimer, the term of this patent is extended or adjusted under 35 U.S.C. 154(b) by 513 days.

(21) Appl. No.: 17/842,941

(22) Filed: Jun. 17, 2022

(65) Prior Publication Data

US 2023/0405535 A1    Dec. 21, 2023

(51) Int. Cl.
*B01F 25/312*    (2022.01)
*A62C 5/00*    (2006.01)

(52) U.S. Cl.
CPC .......... *B01F 25/3123* (2022.01); *A62C 5/002* (2013.01)

(58) Field of Classification Search
CPC ............ B01F 25/3123; B01F 25/31231; B01F 25/31233; A62C 5/002
USPC .......................................................... 261/76
See application file for complete search history.

(56) References Cited

U.S. PATENT DOCUMENTS

| 2,106,043 | A | * | 1/1938 | Urquhart | A62C 5/002 |
| | | | | | 261/21 |
| 2,143,817 | A | * | 1/1939 | Longdin | B05B 7/04 |
| | | | | | 239/428 |
| 2,665,975 | A | * | 1/1954 | Ng | B01D 21/00 |
| | | | | | 208/341 |
| 3,689,237 | A | * | 9/1972 | Stark et al. | B01F 35/833 |
| | | | | | 261/78.2 |
| 5,113,945 | A | * | 5/1992 | Cable | B05B 7/267 |
| | | | | | 261/DIG. 26 |
| 5,324,486 | A | * | 6/1994 | Russo | C10G 9/002 |
| | | | | | 422/208 |
| 8,109,448 | B2 | * | 2/2012 | Giles | A01M 7/0092 |
| | | | | | 239/428 |
| 9,931,601 | B2 | * | 4/2018 | Engelhard | B01F 23/2323 |
| 2007/0036024 | A1 | * | 2/2007 | Kubala | B01F 25/31233 |
| | | | | | 366/163.2 |

FOREIGN PATENT DOCUMENTS

| AU | 2020239793 A1 | * | 4/2022 |
| CN | 111266027 A | * | 6/2020 |
| CN | 211909665 U | * | 11/2020 |
| JP | 2000-28407 A | * | 1/2000 |

OTHER PUBLICATIONS

English Translation of JP 2000-28407 A (Year: 2000).*
English Translation of CN 111266027 A (Year: 2020).*
English Translation of CN 211909665 U (Year: 2020).*

* cited by examiner

*Primary Examiner* — Charles S Bushey
(74) *Attorney, Agent, or Firm* — The Rapacke Law Group, P.A.; Andrew Rapacke

(57) ABSTRACT

A chemical injection system. The chemical injection system includes at least two Venturi injectors in parallel. Each of the Venturi injectors having an injector housing with a longitudinal cavity having the shape of hourglass. One end of the longitudinal cavity forms an injector inlet, and the other end forms an injector outlet. Each of the injector housings also has a first vertical cavity forming an injector port located at the hourglass constriction. The injector inlets are fluidly coupled together to form a shared injector input and each of the injector ports is fluidly coupled to an individual valve. Each of the injector outlets is fluidly coupled to the input a separate T-filter and the outputs of the T-filters are fluidly coupled together to form shared T-filter output.

6 Claims, 9 Drawing Sheets

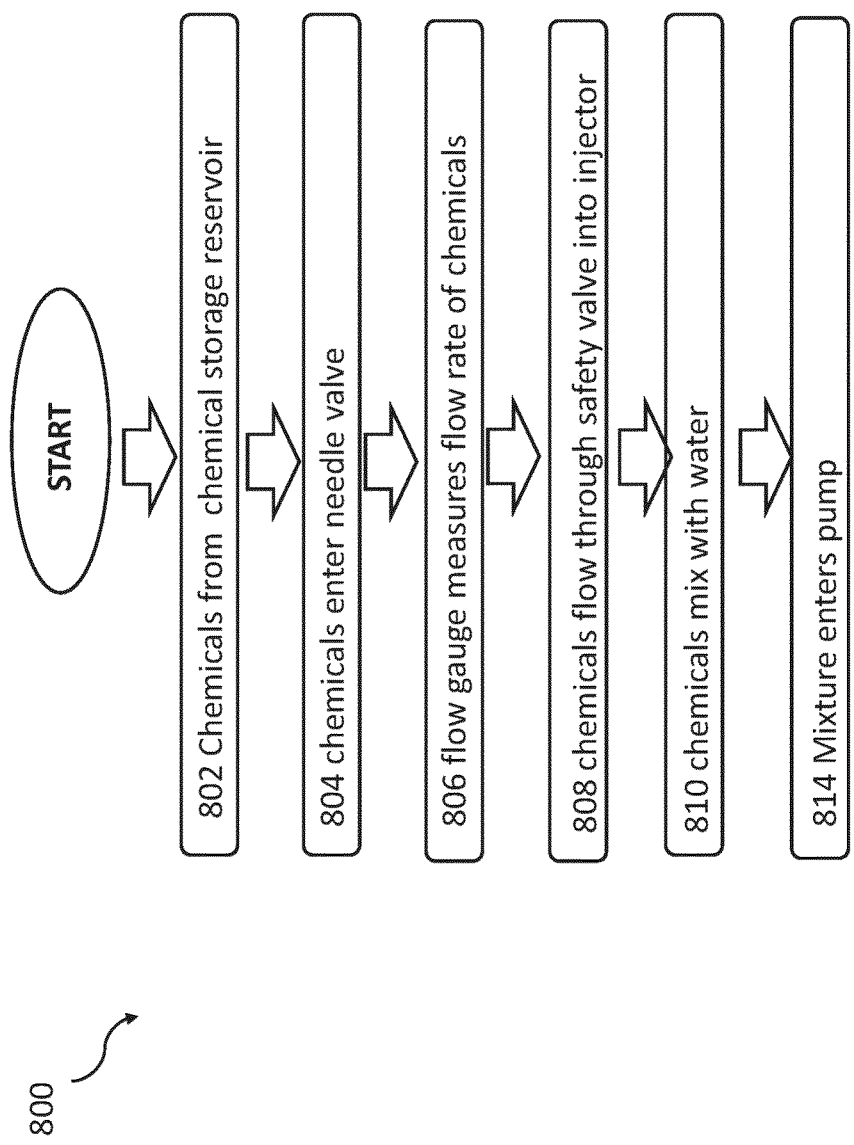

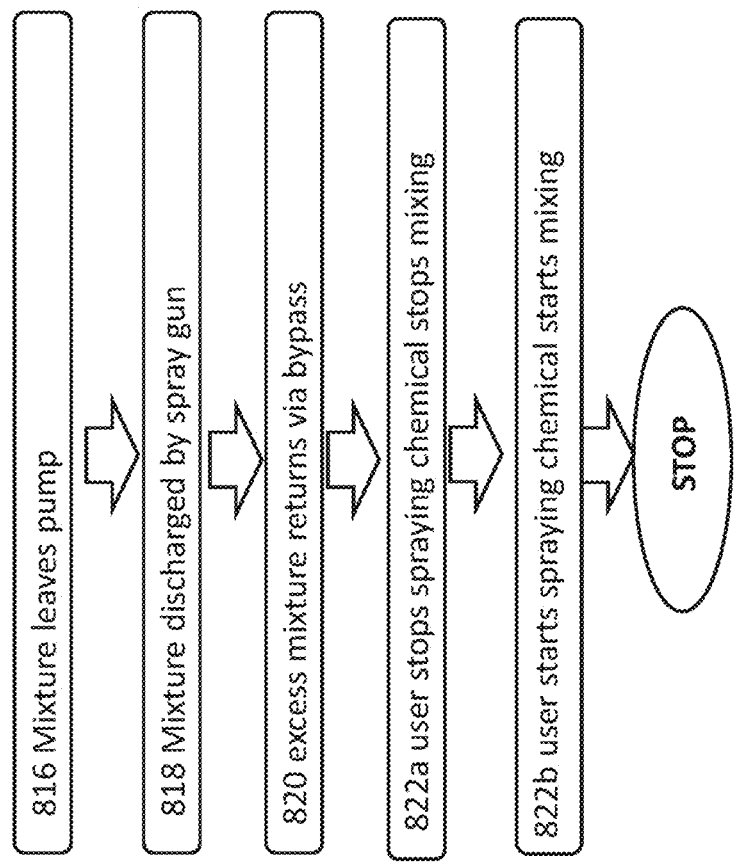

USING A CHEMICAL INJECTION SYSTEM FOR PROCARE PROFESSIONAL SPRAY EQUIPMENT

FIELD

The present disclosure relates to a chemical injection system for tree-spraying, landscaping, fire suppression, and other spraying applications, and more specifically to a chemical injection system that maintains the integrity of a clean water supply.

BACKGROUND OF THE INVENTION

With conventional chemical sprayers, the chemicals are mixed with a carrier fluid before they are utilized, which is problematic and time consuming when you need to spray different chemicals with the same equipment, The following example will highlight some of the disadvantages of a conventional chemical sprayer system configuration. In one scenario, a user may spray a first area with an herbicide. With the conventional chemical sprayer, the herbicide is diluted by mixing the required amount of herbicide in the water storage tank. The user then sprays a first area with the diluted herbicide. However, to apply a second pesticide solution, such as a diluted insecticide to a second area the user must completely empty the water storage tank and cleanly dispose or store the diluted herbicide. The user must then clean the water storage tank to avoid cross contamination. After which, the user fills the primary water tank with clean water and then adds and mixes the second pesticide before spraying.

SUMMARY OF THE INVENTION

In some embodiments, the chemical injection system includes a first Venturi injector and a second Venturi injector. The first Venturi injector having a first injector housing with a first longitudinal cavity having the shape of hourglass. One end of the first longitudinal cavity forms a first injector inlet, and the other end forms a first injector outlet. The first injector housing also has a first vertical cavity forming a first injector port which is located at the constriction in the hourglass shape. The first injector inlet, the first injector outlet, and the first injector port being fluidly coupled. The second Venturi injector having a second injector housing with a second longitudinal cavity having the shape of hourglass. One end of the second longitudinal cavity forms a second injector inlet, and the other end forms a second injector outlet. The second injector housing also has a second vertical cavity forming a second injector port which located at the constriction in the hourglass shape. The second injector inlet, the second injector outlet, and the second injector port being fluidly coupled.

The chemical injector system also includes a first valve fluidly coupled to the first injector port and a second valve fluidly coupled to the second injector port. The chemical injector system also includes a first T-filter having a first T-filter input and first T-filter output, and a second T-filter having a second T-filter input and a second T-filter output coupled to the first T-filter output to form a shared T-filter output. The first injector outlet is fluidly coupled to the first T-filter input and the second injector outlet is fluidly coupled to the second T-filter input. The first injector inlet is fluidly coupled to the second injector inlet to form a shared injector inlet.

In some embodiments, the chemical injector system includes a bypass flow path. The fluid bypass flow path having a bypass inlet fluidly coupled to the shared injector inlet and a bypass outlet fluidly coupled to the shared T-filter output.

In various embodiments, the chemical injection system further includes a primary reservoir and a pump. The pump input is fluidly coupled to the primary reservoir and the pump output is fluidly coupled to the shared injector inlet. In some embodiments, the pump is an on-demand pump. For example, the pump is an on-demand diaphragm pump.

In some embodiments, the pump operates in a demand mode where a pressure switch senses pressure changes within the system and operates the pump. In some instances, the pressure switch is incorporated into the pump. That is, demand pumps work by sensing alterations in pressure and responding by transporting water. In various embodiments, the pump is activated by an external switch rather than a pressure switch. When water is desired, the external switch is manually turned on and the delivery pump will deliver water. Turning off the external switch will turn off the supply from the delivery pump.

In some embodiments, the chemical injection system further includes a secondary reservoir. The secondary reservoir is smaller than the primary reservoir and fluidly coupled to the input of the first valve. The secondary reservoir stores a chemical that is drawn through the first valve and the first injector port when drawn by the Venturi effect.

In various embodiments, the configuration of the chemical injector system prevents the primary reservoir of water from being contaminated by the chemical when the spray nozzle that is fluidly coupled to the shared T-filer output is operating at a reduced pressure by recycled fluid. This is, because any mixed chemical solution is either directly discharged from the system or, in various embodiments, the mixed chemical solution is by-passed from downstream of the pump back to upstream of the pump via a fluidly coupled T-fitting. This T-fitting is also positioned downstream of the shared injector outlet and therefore any fluid that is recycled remains in a closed loop downstream from the injection system, to maintain deserted mix ratio, until discharged from the system, ensuring that the water supply remains chemical free.

In various embodiments, the Venturi effect is used to draw the chemical through the first injector port at a flow rate of between about 0.1 ounce per minute and about 25 ounces per min when the first valve is in the open position.

In some embodiments, the chemical injector system further includes a first chemical needle valve fluidly coupled to the first injector port and a first chemical flow gauge fluidly coupled between the first chemical needle valve and the first injector port. The first chemical flow gauge is operable to monitor the rate of flow of a first chemical and the first chemical needle valve is operable to regulate the rate of flow the first chemical.

In some embodiments, the chemical injection system includes a first Venturi injector and a second Venturi injector. The first Venturi injector having a first injector housing with a first longitudinal cavity having the shape of hourglass. One end of the first longitudinal cavity forms a first injector inlet, and the other end forms a first injector outlet. The first injector housing also has a first vertical cavity forming a first injector port which is located at the constriction in the hourglass shape. The first injector inlet, the first injector outlet, and the first injector port being fluidly coupled. The second Venturi injector having a second injector housing with a second longitudinal cavity having the shape of hourglass. One end of the second longitudinal cavity forms a second injector inlet, and the other end forms a second injector outlet. The second injector housing also has a second vertical cavity forming a second injector port which is located at the constriction in the hourglass shape. The second injector inlet, the second injector outlet, and the second injector port being fluidly coupled.

The chemical injector system also includes a first valve fluidly coupled to the first injector port and a second valve fluidly coupled to the second injector port. The chemical injector system also includes a first T-filter having a first T-filter input and first T-filter output, and a second T-filter having a second T-filter input and second T-filter output. The first injector outlet is fluidly coupled to the first T-filter input and the first T-filter output is fluid coupled to the second injector inlet. The second outlet is fluidly coupled to the second T-filter input. The first injector inlet forms the input of the chemical injection system, and the second T-filter output forms the output of the chemical injection system.

In some embodiments, the chemical injector system includes a bypass flow path. The fluid bypass flow path having a bypass inlet fluidly coupled to the first injector inlet and a bypass outlet fluidly coupled to the second T-filter output.

In various embodiments, the chemical injection system further includes a primary reservoir and a pump. The pump input is fluidly coupled to the primary reservoir and the pump output is fluidly coupled to the first injector inlet. In some embodiments, the pump is an on-demand pump. For example, the pump is an on-demand diaphragm pump.

In some embodiments, the chemical injection system further includes a secondary reservoir. The secondary reservoir is smaller than the primary reservoir and fluidly coupled to the input of the first valve. The secondary reservoir stores a chemical that is drawn through the first valve and the first injector port when drawn by the Venturi effect.

In various embodiments, the configuration of the chemical injector system prevents the primary reservoir of water from being contaminated by the chemical when the spray nozzle that is fluidly coupled to the second T-filer output is operating at a reduced pressure by recycled fluid. This is, because any mixed chemical solution is either directly discharged from the system or, in various embodiments, the mixed chemical solution is by-passed from downstream of the pump back to upstream of the pump via a fluidly coupled T-fitting. This T-fitting is also positioned downstream of the shared injector outlet and therefore any fluid that is recycled remains in a closed loop downstream from the injection system, to maintain deserted mix ratio, until discharged from the system, ensuring that the water supply remains chemical free.

In various embodiments, the Venturi effect is used to draw the chemical through the first injector port at a flow rate of between about 0.1 ounce per minute and about 25 ounces per minute when the first valve is in the open position.

In some embodiments, the chemical injection system includes a Venturi injector. The Venturi injector having an injector housing with a longitudinal cavity having the shape of hourglass. One end of the longitudinal cavity forms an injector inlet, and the other end forms an injector outlet. The injector housing also has a vertical cavity forming an injector port which located at the constriction in the hourglass shape. The injector inlet, the injector outlet, and the injector port are fluidly coupled. The chemical injector system further includes a valve fluidly coupled to the injector port and a T-filter having a T-filter input fluidly coupled to the injector outlet and a T-filter output. Lastly, the chemical injector system includes a bypass flow path. The fluid bypass flow path having a bypass inlet fluidly coupled to the injector inlet and a bypass outlet fluidly coupled to the T-filter output.

In various embodiments, the chemical injection system further includes a primary reservoir and a pump. The pump input is fluidly coupled to the primary reservoir and the pump output is fluidly coupled to the injector inlet. In some embodiments, the pump is an on-demand pump. For example, the pump is an on-demand diaphragm pump.

In some embodiments, the chemical injection system further includes a secondary reservoir. The secondary reservoir is smaller than the primary reservoir and fluidly coupled to the input of the valve. The secondary reservoir stores a chemical that is drawn through the valve and the injector port when drawn by the Venturi effect.

In various embodiments, the configuration of the chemical injector system prevents the primary reservoir of water from being contaminated by the chemical when the spray nozzle that is fluidly coupled to the T-filer output is operating at a reduced pressure by recycled fluid. This is, because any mixed chemical solution is either directly discharged from the system or, in various embodiments, the mixed chemical solution is by-passed from downstream of the pump back to upstream of the pump via a fluidly coupled T-fitting. This T-fitting is also positioned downstream of the shared injector outlet and therefore any fluid that is recycled remains in a closed loop downstream from the injection system, to maintain deserted mix ratio, until discharged from the system, ensuring that the water supply remains chemical free.

In various embodiments, the Venturi effect is used to draw the chemical through the injector port at a flow rate of between about 1 ounce per minute and about 10 ounces per when the first valve is in the open position.

In some embodiments, the chemical injection system further includes a calibrated differential pressure sensor. The calibrated differential pressure sensor is coupled between the injector inlet and the injector port and measures the drop in pressure at the injector port with respect to the pressure at the injector inlet. The drop in pressure at the injector port is proportional to the flow rate of the fluid in the longitudinal cavity.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features and advantages of the present disclosure will be more fully described in, or rendered obvious by, the following detailed description of the preferred embodiments, which are to be considered together with the accompanying drawings, wherein like numbers refer to like parts and further, wherein:

FIG. 8 is an example flow diagram of a process of injecting chemicals into a carrier fluid using the chemical injection systems of FIG. 2 through FIG. 7, in accordance with some embodiments described herein.

Figure 1:
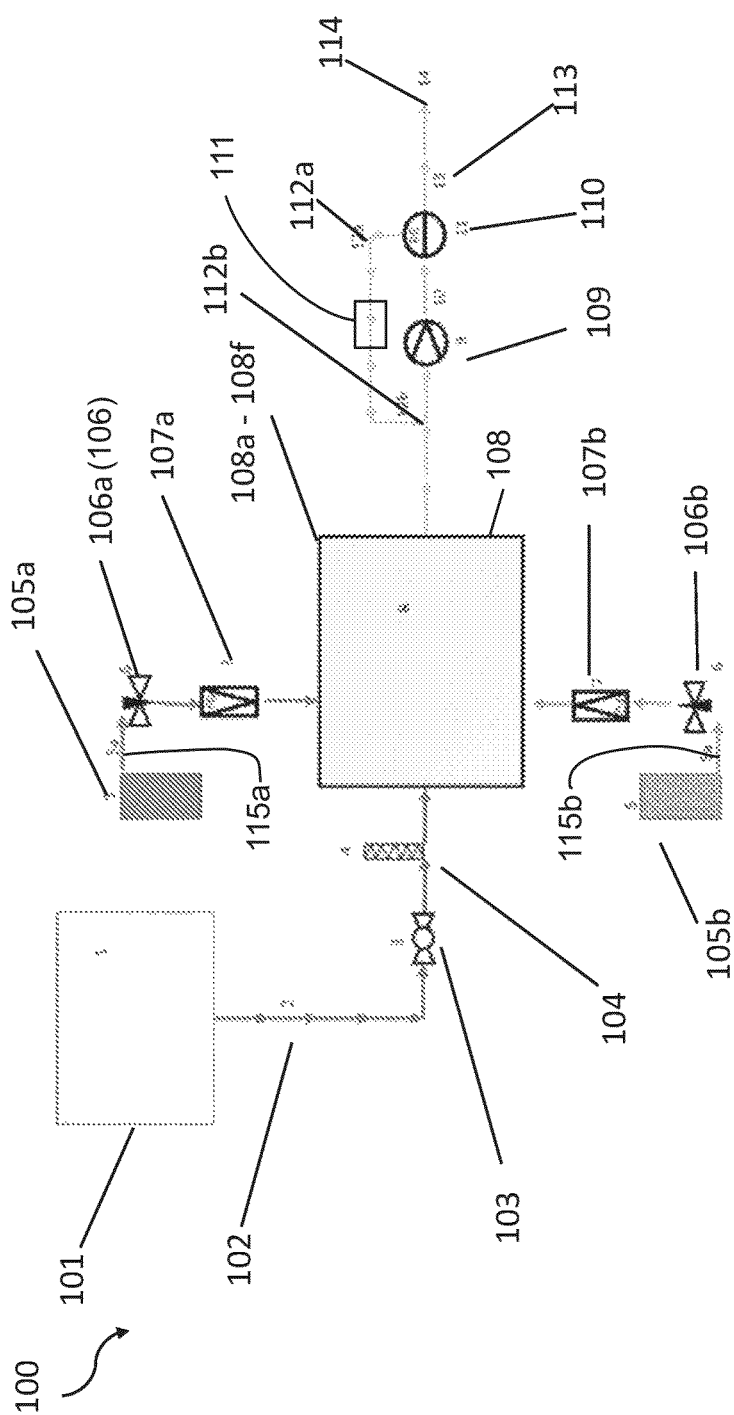
FIG. 1 is a block diagram of components required for a chemical spray system that are needed in addition to the chemical injection systems of FIG. 2 through FIG. 7, in accordance with some embodiments described herein.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

Reference will now be made in detail to the present preferred embodiment(s), examples of which is/are illustrated in the accompanying drawings. Whenever possible, the same reference numerals will be used throughout the drawings to refer to the same or like parts.

The standard practice in the lawn care and structural pest control industries is to batch mix chemicals with clean water based on a user calibration test, and place that mixture into a storage tank. The diluted chemical mixture then flows through a ball valve and filter to a pump. However, this presents a problem in some scenarios. For example, in one scenario, a user may target spray a first area with diluted herbicide from a storage tank. However, to apply a second solution, such as a diluted insecticide to a second area. The user must completely empty the storage tank, dispose or store the diluted herbicide and clean and refill the storage tank with the desired insectile solution to avoid cross contamination. This process is expensive and time-consuming must be repeated each time the chemicals are changed to avoid cross contamination.

Another reason these convention chemical sprayers have problems with contamination is related to the methods that these convention chemical sprays used to preventing over pressuring the nozzle. Many of these conventional chemical spray systems are configured with a recirculation manifold whereby excess flow from the pump is diverted back to the storage tank. A valve and pressure gauge are provided on the sprayer so the user can adjust the excess flow going back to the storage tank while maintaining adequate pressure for the lower spray applications.

There is a need for a novel chemical spray system that segregates the chemical from the clean water tank to prevent contamination, while being easily plumbed, operate, and cleaned. There is also a need for a variable pressure sprayer, where the mixed fluid is not recycled to the diluent tank when operating at reduced spraying pressure. The present invention satisfies these requirements.

FIG. 1 shows the additional components that may be requirement for a chemical spraying system 100 that are not included in the proposed chemical injection systems 108 of FIG. 2 through FIG. 7. In some embodiments, the chemical spraying system 100 also comprises a water storage reservoir 101 for storing clean water to act a fluid carrier for chemical agents. The water storage reservoir 101 is fluidly coupled to the chemical injection system 108 by a clean water flow line 102. In some embodiments the clean water flow line 102 is a high-pressure line. In various embodiments, the chemical spraying system 100 also comprises a clean water flow ball valve 103 and a clean water T-screen filter 104 inserted in line with the clean water flow line 102. The input to the clean ball valve 103 is connected to the output of the water storage reservoir 101 by a first portion of the clean water flow line 102. The input of the clean water T-screen filter 104 is connected to the output of the clean water ball valve 103 by a second portion of the clean water flow line 102. The output of the clean water T-screen 104 is connected to the input of the chemical injection system 108.

In various embodiments, the chemical spraying system 100 also comprises a first chemical storage reservoir 105a. In various embodiments, the first chemical storage reservoir 105a is fluidly coupled to a first injector input of the chemical injection system 108 by a first chemical flow line 115a. In various embodiments, the chemical spraying system 100 also comprises a first chemical flow gauge 107a and a first chemical needle valve 106a inserted in line with the first chemical flow line 115a. The first needle valve 106a is connected to the first chemical storage reservoir 105a by a first portion of the first chemical flow line 115a. The first needle valve 106a is connected to the first chemical flow gauge 107a by a second portion of the first chemical flow line 115a, and the first chemical flow gauge 107a is connected to the first Venturi injector port of the chemical injection system 108 by a third portion of the first chemical flow line 115a.

In some embodiments, the chemical spraying system 100 also comprises a second chemical storage reservoir 105b. In various embodiments, the second chemical storage reservoir 105b is fluidly coupled to a second injector input of the chemical injection system 108 by a second chemical flow line 115b. In various embodiments, the chemical spraying system 100 also comprises a second chemical flow gauge 107b and a second chemical needle valve 106b inserted in line with the second chemical flow line 115b. The second needle valve 106b is connected to the second chemical storage reservoir 105b by a first portion of the second chemical flow line 115b. The second needle valve 106b is connected to the second chemical flow gauge 107b by a second portion of the second chemical flow line 115b, and the second chemical flow gauge 107b is connected to the second Venturi injector port of the chemical injection system 108 by a third portion of the first chemical flow line 115a.

In various embodiments, the chemical spraying system 100 also comprises a fluid pump 109. The fluid pump 109 is connected to the output of the chemical injection system 108 by a high-pressure line. In some embodiments, the chemical injection system 108 also comprises a region of flow under pressure 110. In various embodiments, the chemical spraying system 100 also comprises a pressure regulator 111. The pressure regulator 111 having an input connected to the fluid pump 109 by the region of flow under pressure 110. The pressure regulator 111 having a bypass flow path 112a connected at 112b to the high-pressure line between the fluid pump 109 and the injection system 108.

In some embodiments, the chemical spraying system 100 also comprises a pressure regulated solution flow region 113. The input to the pressure regulated solution flow region 113 is connected to the high-pressure output of the pressure regulator 111. In various embodiments, the chemical spraying system 100 also comprises a fluid discharge device connect to the output of the pressure regulated solution flow region 113. The fluid discharge device is a spray wand 114, a spray gun, a boom sprayer, and the like.

Figure 2:
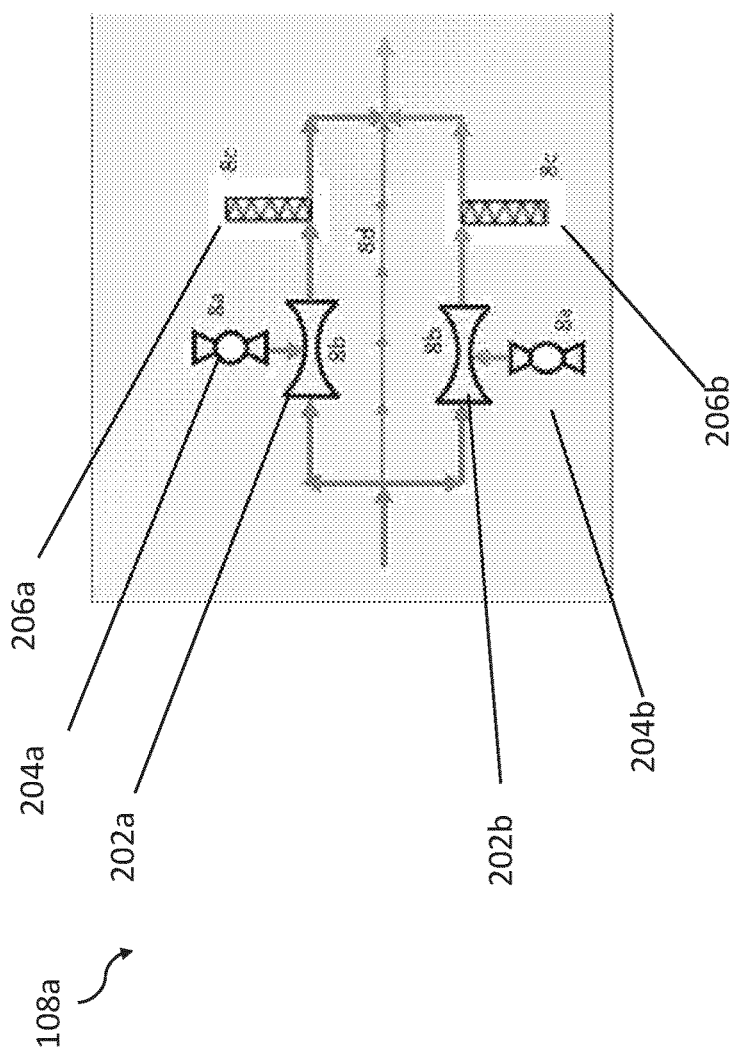
FIG. 2 is a block diagram of a first chemical injection system, in accordance with some embodiments described herein.
Figure 3:
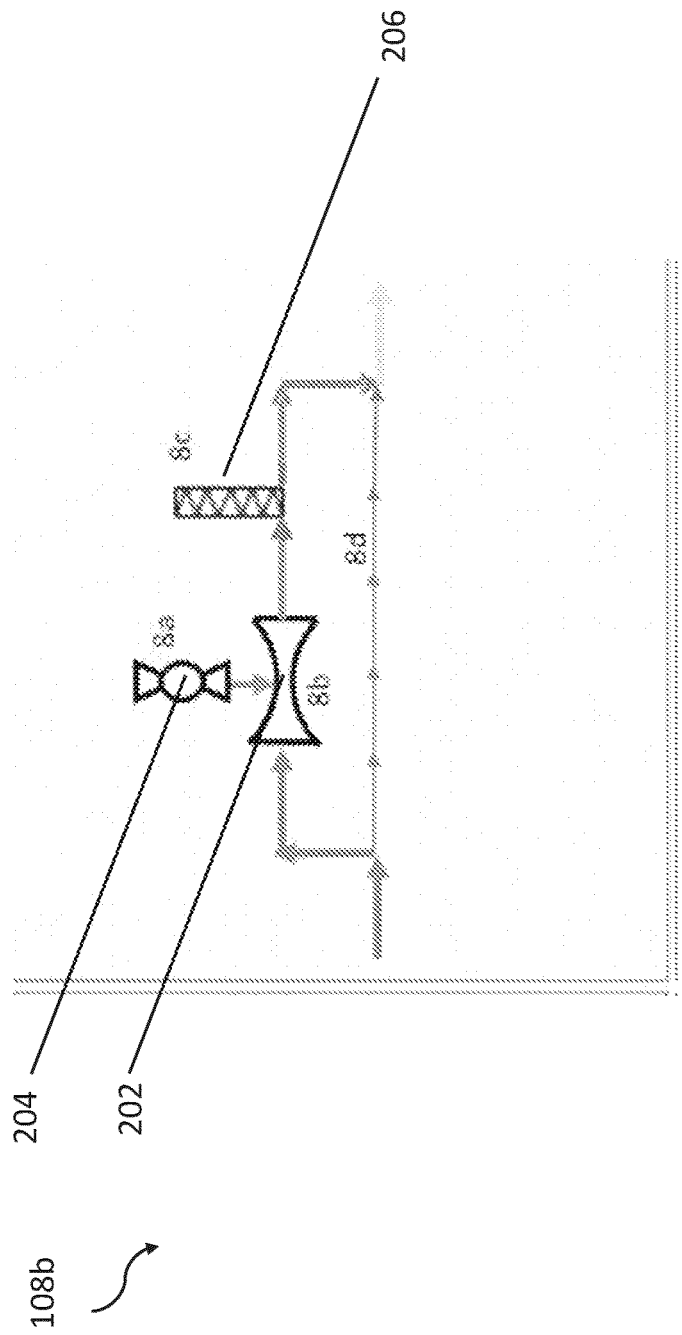
FIG. 3 is a block diagram of a second chemical injection system, in accordance with some embodiments described herein.
Figure 4:
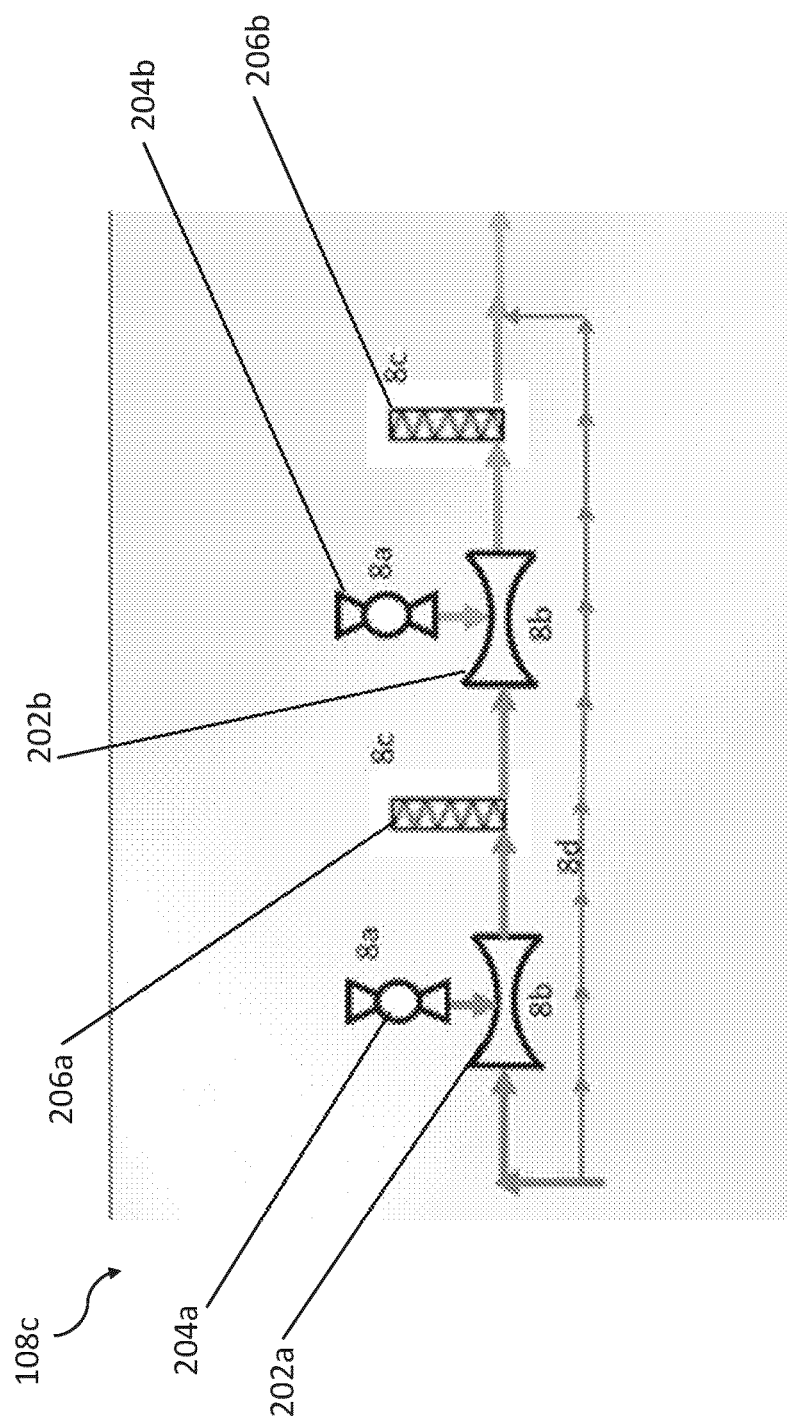
FIG. 4 is a block diagram of a third chemical injection system, in accordance with some embodiments described herein.
Figure 5:
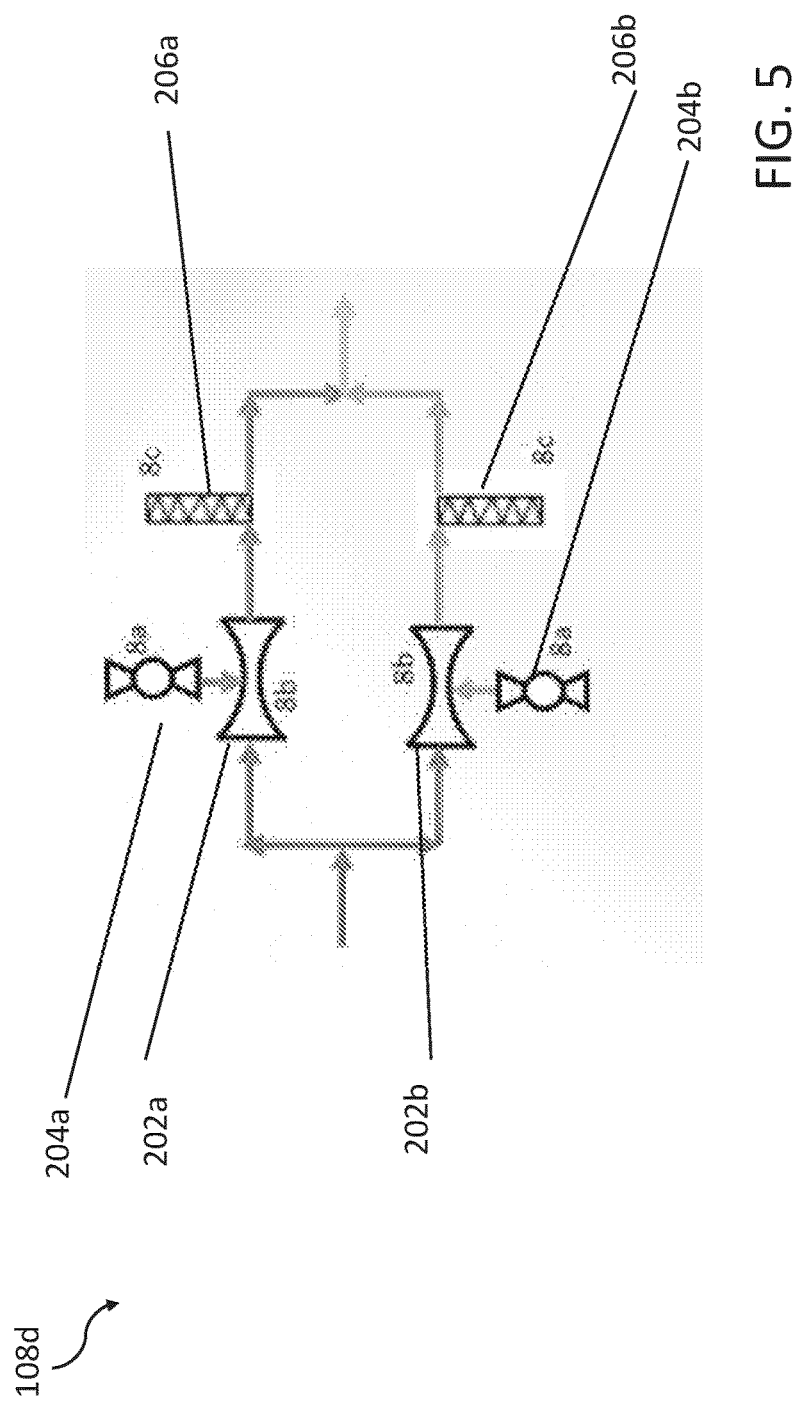
FIG. 5 is a block diagram of the chemical injection system of FIG. 2 without a bypass, in accordance with some embodiments described herein.
Figure 6:
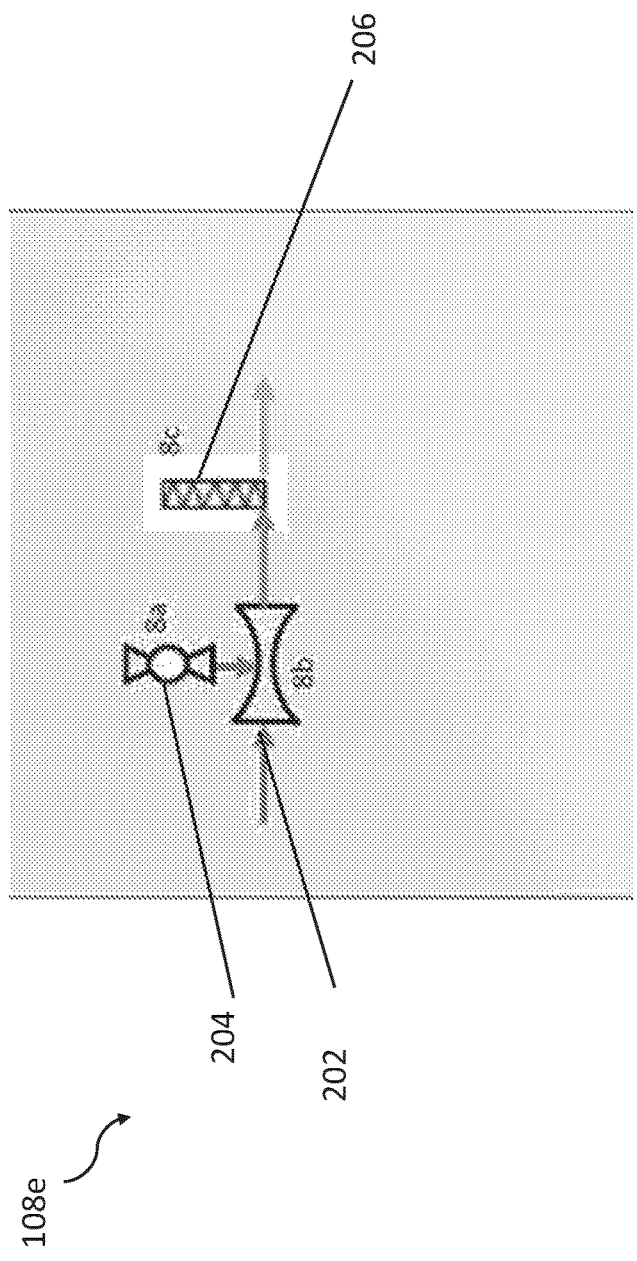
FIG. 6 is a block diagram of the chemical injection system of FIG. 3 without a bypass, in accordance with some embodiments described herein.
Figure 7:
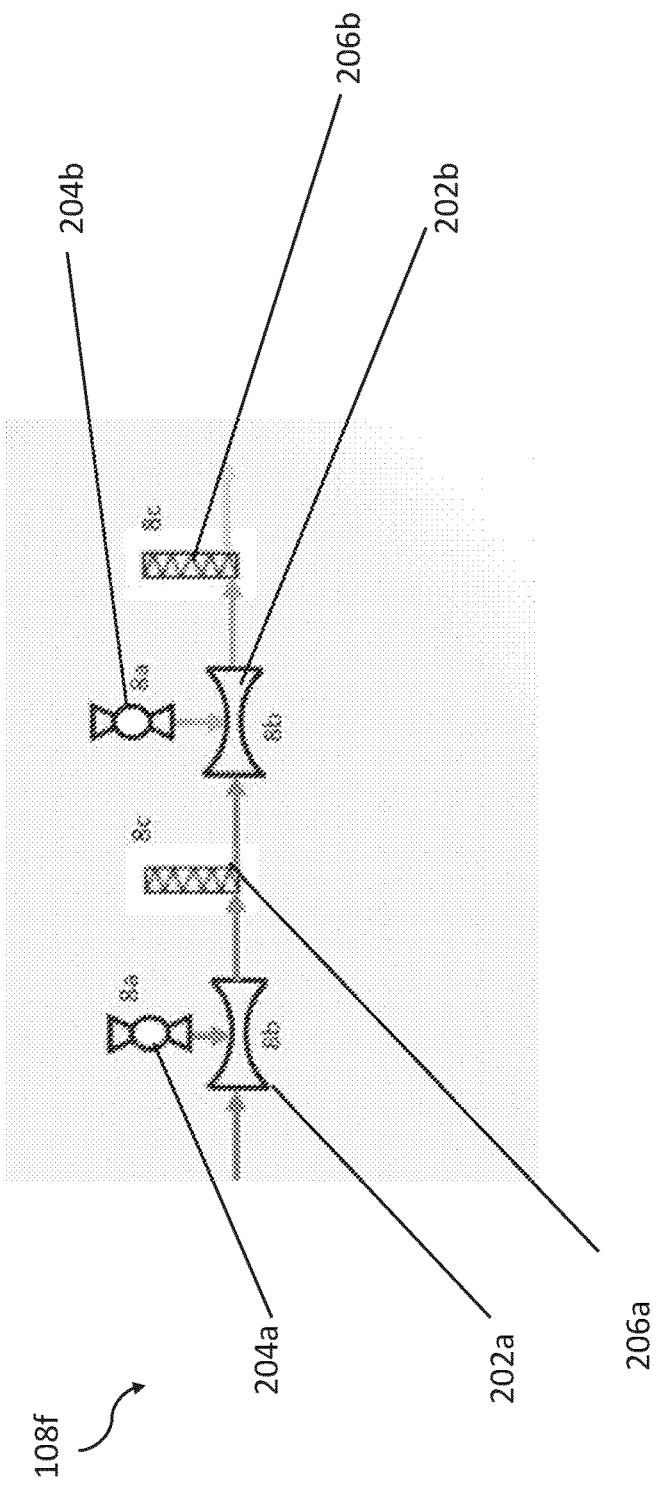
FIG. 7 is a block diagram of the chemical injection system of FIG. 4 without a bypass, in accordance with some embodiments described herein.

As shown in FIG. 2, in some embodiments, the chemical injection system 108a comprises a first Venturi injector 202a and a second Venturi injector 202b. The first Venturi injector 202a having a first Venturi inlet port, a first Venturi outlet port, and a first Venturi injector port, and the second Venturi injector 202b having a second Venturi inlet port, a second Venturi outlet port, and a second Venturi injector port. The chemical injection system 108a also comprises a first chemical ball valve 204a fluidly coupled to the first injector port and a second chemical ball valve 204b fluidly connected to the second Venturi injector port.

While the chemical injection system 108a of FIG. 2 comprises two Venturi injectors 202a, 202b with a single optional parallel water bypass flow path, in some embodiments, the configuration of FIG. 2A is used to add two or more chemicals to the carrier liquid. For example, the chemical injection system 108a of FIG. 2 can comprise as many Venturi injectors 202a, 202b in series as is needed. In various embodiments, the configuration of FIG. [2A] 2 is used in parallel, additional Venturi injectors can significantly decrease the Venturi effect in individual Venturi Injectors resulting in inadequate pressure difference required for chemical injection.

In some embodiments, the configuration of FIG. 2 is used to add the first chemical and the second chemical to the carrier liquid at the same time. The volume of each of the two or more chemicals being added to the carrier liquid can be varied independently in real time by changing the respective valve positions of each of the two or more needle valves FIG. 1, 106.

In some embodiments, the configuration of the optional water bypass flow path does not change as additional Venturi injectors 202a, 202b are added in parallel. In various embodiments, additional optional water bypass flow paths are added as additional Venturi injectors 202a, 202b are added. In some embodiments, the size and/or rate flow of the optional water bypass flow path is increased or decreased as additional Venturi injectors 202a, 202b are added in parallel. In various embodiments, the flow rate of the optional water bypass flow path is modified by varying the position of an inline flow valve (not shown).

As shown in FIG. 2, in some embodiments, the chemical injection system 108a comprises a single Venturi injector 202a or 202b. The first Venturi injector 202a having a Venturi inlet port, a Venturi outlet port, and a Venturi injector port. The chemical injection system 108a also comprises a first chemical ball valve 204a fluidly coupled to the Venturi injector port. The chemical injector system 108b also comprises a first T-filter 206a having a T-filter input and a T-filter output. The Venturi outlet port is fluidly connected to the T-filter input. The T-filter output being the output of the chemical injection system 108a and the Venturi inlet port being the input of the chemical injection system 108a. The configuration of FIG. 2 allows the volume of the chemical being added to the carrier liquid to be varied in real time by changing the valve positions of the needle valves FIG. 1, 106.

In some embodiments, the chemical injector system 108a of FIG. 2 further includes an optional parallel water bypass flow path comprising a water bypass flow path inlet and a water bypass flow path outlet. The water bypass flow path inlet being fluidly coupled to the Venturi inlet port and the water bypass flow path outlet being fluidly coupled to the T-filter output.

In some embodiments, the chemical injection system [108c] comprises a first Venturi injector 202a and a second Venturi injector 202b. The first Venturi injector 202a having a first Venturi inlet port, a first Venturi outlet port, and a first Venturi injector port, and the second Venturi injector 202b having a second Venturi inlet port, a second Venturi outlet port, and a second Venturi injector port. The chemical injection system 108a of FIG. 2 also comprises a first chemical ball valve 204a fluidly coupled to the first injector port and a second chemical ball valve 204b fluidly connected to the second Venturi injector port. The chemical injector system also comprises a first T-filter 206a having a first T-filter input and a first T-filter output, and a second T filter 206b having a second T-filter input and a second T-filer output.

The first Venturi outlet port is fluidly connected to the first T-filter input port and the second Venturi outlet port is fluidly coupled to the second T-filter input port. The first T-filter output is fluidly coupled to the second Venturi inlet port. That is, the chemical injection system 108a of 2 comprises two Venturi injectors 202a, 202b that are fluidly coupled in series.

In some embodiments, the chemical injector system 108a of FIG. 2 further comprises an optional parallel having a water bypass flow path inlet and a water bypass flow path outlet. The water bypass flow inlet being fluidly coupled to the first Venturi inlet port and the second T-filter output.

While the chemical injection system 108a of FIG. 2 comprises two Venturi injectors 202 with a single optional bypass, the chemical injection system 108a of FIG. 2 can comprise as many Venturi injectors 202a, 202b in series as is needed. In various embodiments, the configuration of FIG. 2 is used to add the first chemical or the second chemical, or both, to the carrier liquid. In some embodiments, the configuration of FIG. 2 is used to add the first chemical and the second chemical to the carrier liquid at the same time. The amount of each of the two or more chemicals added to the carrier liquid can be varied independently by the respective valve positions of each of the two or more needle valves FIG. 1, 106.

In some embodiments, the configuration of the optional water bypass flow path does not change as additional Venturi injectors [202] 202a, 202b are added in series. In various embodiments, additional optional water bypass flow paths are added as additional Venturi injectors 202a, 202b are added. In some embodiments, the size and/or rate flow of the optional water bypass flow path is increased or decreased as addition Venturi injectors 202a, 202b are added in series. In various embodiments, the flow rate of the optional water bypass flow path is modified by varying the position of an inline flow valve (not shown).

In some embodiments, the chemical injection system 108a comprises a first Venturi injector 202a and a second Venturi injector 202b. The first Venturi injector 202a having a first Venturi inlet port, a first Venturi outlet port, and a first Venturi injector port, and the second Venturi injector 202b having a second Venturi inlet port, a second Venturi outlet port, and a second Venturi injector port. The chemical injection system 108d also comprises a first chemical ball valve 204a fluidly coupled to the first injector port and a second chemical ball valve 204b fluidly connected to the second Venturi injector port. The chemical injector system also comprises a first T-filter 206a having a first T-filter input and a first T-filter output, and a second T filter 206b having a second T-filter input and a second T-filer output. The first Venturi outlet port is fluidly connected to the first T-filter input and the second Venturi outlet port is fluidly coupled to the second T-filter input. The first T-filter output and the second T-filter output are fluidly coupled together to form a shared T-filter output. The first Venturi inlet port and the second Venturi inlet port are fluidly coupled together to form a shared Venturi inlet port. That is, the chemical injection system 108a of FIG. 2D comprises two Venturi injectors 202 that are fluidly coupled in parallel.

While the chemical injection system 108d of FIG. 2D comprises two Venturi injectors 202a, 202b with a single optional parallel water bypass flow path, in some embodiments, the configuration is used to add two or more chemicals to the carrier liquid.

In various embodiments, the chemical injection system is used to add the first chemical or the second chemical, but not both, to the carrier liquid. In some embodiments, the chemical injection system is used to add the first chemical and the second chemical to the carrier liquid at the same time. The dynamic volume of each of the two or more chemicals being added to the carrier liquid can be varied independently in real time by changing the respective valve positions of each of the two or more needle valves FIG. 1, 106.

In some embodiments, the chemical injection system comprises a Venturi injector. The Venturi injector having a Venturi inlet port, a Venturi outlet port, and a Venturi injector port. The chemical injection system [108e] also comprises a chemical ball valve fluidly coupled to the Venturi injector port. The chemical injector system also comprises a T-filter having a T-filter input and a T-filter output. The Venturi outlet port is fluidly connected to the T-filter input. The T-filter output comprises the output of the chemical injection system and the Venturi inlet port comprises the input of the chemical injection system.

In some embodiments, the chemical injection system comprises a first Venturi injector and a second Venturi injector. The first Venturi injector having a first Venturi inlet port, a first Venturi outlet port, and a first Venturi injector port, and the second Venturi injector having a second Venturi inlet port, a second Venturi outlet port, and a second Venturi injector port. The chemical injection system also comprises a first chemical ball valve fluidly coupled to the first injector port and a second chemical ball valve fluidly connected to the second Venturi injector port. The chemical injector system also comprises a first T-filter having a first T-filter input and a first T-filter output, and a second T filter having a second T-filter input and a second T-filer output.

The first Venturi outlet port is fluidly connected to the first T-filter input port and the second Venturi outlet port is fluidly coupled to the second T-filter input port. The first T-filter output is fluidly coupled to second Venturi inlet port. That is, the chemical injection system comprises two Venturi injectors that are fluidly couped in series.

While the chemical injection system may include two Venturi injectors, the chemical injection system can comprise as many Venturi injectors in series as is needed. In various embodiments, the chemical injection system may be used to add the first chemical or the second chemical, but not both, to the carrier liquid. In some embodiments, the chemical injection system may be used to add the first chemical and the second chemical to the carrier liquid at the same time. The amount of each of the two or more chemicals added to the carrier liquid can be varied independently by the respective valve positions of each of the two or more chemical ball valves.

The chemical injector system also comprises a first T-filter having a first T-filter input and a first T-filter output, and a second T-filter having a second T-filter input and a second T-filer output. The first Venturi outlet port is fluidly connected to the first T-filter input port and the second Venturi outlet port is fluidly coupled to the second T-filter input port. The first T-filter output is fluidly coupled to the second Venturi inlet port. That is, the chemical injection system comprises two Venturi injectors that are fluidly couped in series.

In some embodiments, the fluid pump 109 is an on-demand pump is that the fluid pump 109 draws water from a point of storage and then pushes the water to a point of use. In some embodiments, the on-demand pump is a diaphragm pump. Unlike a rotatory pump which moves water with a spinning propeller in a chamber, the diaphragm pump moves water with a rubber diaphragm. The rubber diaphragm has cups, and as the cups rotate the are cups squeeze together creating suction and the water drawn into the diaphragm pump. When the cups are pulled apart and the suction is broken, the water is ejected from the diaphragm pump. This process of suction and ejection creates the draw and push action of the diaphragm pump. The use of a pressure regulator 111 allows the user to maintain a set pressure on the spray wand 114 ensuring a more consistent application of liquid chemicals. Demand pumps build an excess of pressure when discharge is stopped until the demand pump shuts off. When the user resumes discharge of mixture there is a sudden surge of flow, followed by a drop until the demand pump resumes full operation.

On-demand pumps are normally rated to carry water and perform optimally when delivering clean water. On-demand pumps do not normally pump chemical solutions and certain chemical solutions will degrade the rubber of the diaphragm demand pump rendering the diaphragm demand pump unusable This is another reason why is important to prevent contamination of the water storage reservoir 101 with chemicals. By maintaining a clean water supply, system components can readily be flushed of chemicals increasing durability and service life of components.

In some embodiments, a bypass pump is used where a wide range of flows and pressures are needed. For instance, with spray bars having multiple nozzles which are independently controlled. This is because of the bypass pump's ability to bypass excess fluid flow within the bypass pump. However, the bypass pump's ability to bypass excess fluid flow may be limited to a relatively short period of time and/or flow rate before the contaminated fluid has to be recycled back into the water storage reservoir 101.

In various embodiments, the chemical to be sprayed is a chemical pesticide. Pesticides are substances that are meant to control pests. The term pesticide includes animal repellent, avicide, insect repellent, bactericide, insecticides nematicide, herbicide, molluscicide, piscicide, rodenticide, antimicrobial, fungicide, lampricide, and the like.

In various embodiments, the chemical to be sprayed is a chemical pesticide. Pesticides are substances that are meant to control pests. The term pesticide includes animal repellent, avicide, insect repellent, bactericide, insecticides nematicide, herbicide, molluscicide, piscicide, rodenticide, antimicrobial, fungicide, lampricide, and the like.

In various embodiments, the chemical to be sprayed is a chemical insecticide. Insecticides are substances used to kill insects. The term insecticides include ovicides and larvicides which are used against eggs and larvae.

In various embodiments, each of the chemical pesticides, herbicides, insecticides, and the like are mixed at a rate of between about 1% and about 10% by volume with water. In some embodiments, the flow rate of the chemical through the injector port is between about 0.1 ounce per minute and about 25 ounces per minute.

In various embodiments, of the chemical spray system 100 a calibration test is performed. The calibration test comprises measuring a period of time that it takes to treat an area of known size. Using this information, the time that it takes each unit area can be calculated. The rate of flow of the chemical spray system 100 is then determined. In some embodiments, the rate of flow is determined by measuring the volume of fluid that is dispensed over a set period of time, or vice vera, using a measurement container. For example, the spray wand 114 is place over a measurement container and the rate of flow is determined by measuring the amount of fluid discharged during a set period of time, from which the rate of flow in gallons per minute can be calculated.

In various embodiments, the calculated rate of flow is between about 1 gallon per minute and about 10 gallons per minute. For example, in some embodiments, the rate of flow is about 4 gallons per minute. Knowing the rate of flow, and the time that it takes to cover each unit, the number of gallons applied to each unit area can then be determined. Knowing how much active ingredient (chemical) should be applied to each unit area the active ingredient by volume can be determined. For example, in some embodiments, the active ingredient is between about 1% and about 10% by volume. The position of the chemical needle valve 106 can be set accordingly. An addition calibration process should be performed each time a change is make to a device that affects the flow rate of the chemical spray system 100.

The chemical injection system 108 configurations of FIG. 2 through FIG. 7, and specifically the addition of components 202 through 206, allows chemicals to be mixed as they are utilized and still achieve the targeted application rate at a tolerance level that satisfies or exceeds industry standards. That is, the chemicals are not premixed and stored in the water storage reservoir 101. Further, the proposed chemical injection systems 108 allow the user to change, within limitations, the fluid discharge rate and pressure in real time without requiring a new calibration test to be performed. For example, the chemical discharge rate can be adjusted based on, at least in part, the pressure, operator pace, desired mix ratio, chemical viscosity, desired mix ratio, and the like.

The chemical injection systems 108 configurations of FIG. 2 through FIG. 7 can achieve this because these chemical injection systems 108 utilize a calculation that provides a variable to set on the chemical flow gauge 107 that only measures the volume of chemical being injected. That is, any increase or decrease in the flow rate of the carrier liquid through the Venturi injector 202 produces a corresponding and proportional increase, or decrease, in the suction or pressure vacuum seen at the Venturi injector port. The change in vacuum pressure at the Venturi injector port results in a corresponding and proportional increase, or decrease, in pressure within the chemical carrier line and a corresponding and proportional change in the rate of flow of the chemical. Therefore, the chemical is vacuum fed at a flow rate that is proportional to the carrier flow rate. This change in rate of flow is instantaneously visible on the chemical flow gauge 107. Therefore, any change in the amount of carrier fluid being dispensed, and its impact on the volume of liquid chemical being injected, is accounted for by the corresponding adjustment of the injection flow rate of the liquid chemical using the needle valve 106 to maintain to the targeted gauge value.

In various embodiments, the chemical is drawn from the chemical storage tank through a needle valve 106 coupled to an in-line chemical flow gauge 107, or vice versa, to the Venturi injector port as shown in FIG. 1. The in-line chemical flow gauge 107 measures the amount of chemical flowing from the chemical storage reservoir 105. A needle valve 106 is a type of valve with a small port and threaded needle-shaped plunger. The construction of the needle valve allows precise regulation of a flow of fluid, be it liquid or gas. The flow position of the needle valve 106 is adjusted in response to a change in the rate of flow of the liquid chemical. In some embodiments, the user adjusts the position of the needle valve 106 to maintain the target flow rate. In various embodiments, the chemical is also drawn through a chemical ball valve 204 before the chemical reaches the Venturi injector port. The chemical ball valve's 204 construction allows chemical injection to be stopped without varying the needle valve 106 setting, that is the flow position of the needle valve 106, and then resumed with minimal impact on the flow rate of the chemical.

In some embodiments, the chemical flows through a safety shut-off valve. The shut off valve may be a ball valve, gate valve, globe valve, angled fixture shut-off valve, straight fixture shutoff valve, stop-and-waster valve, needle valve, and the like.

In some embodiments, the chemicals and/or water flows through a check valve or one-way valve. In a conventional water system, a check valve may prevent backflow of contaminated water into the clean water supply lines. However, a check valve requires a pressure differential to work, and can therefore remain partially open at low reverse flow rates resulting in contamination of the clean water supply. Check valves are also prone to valve flutter, which can lead to failure of associated components and the check valve itself, which again results in contamination of the clean water supply.

While the chemical injection system 108 will be described mainly in the context of lawn care, and the application of pesticides, herbicides, insecticides, and the like. The proposed chemical injection system 108 can be used in any industry requiring the controlled application of any chemical within a carrier fluid. For example, in some embodiments, the chemical is a fire retardant that is designed to wet and chemically retard a fire's progress through an area of vegetation. In this application the chemical will likely be ammonium phosphate, a basic plant multi-nutrient fertilizer, which is mixed at a rate of about 10% by volume with water.

In some embodiments, the flow of water from the water storage reservoir 101 is regulated and the flow rate does not need to be measured. In various embodiments, the flow of water from the water storage reservoir 101 is not regulated and an in-line flow gauge is used to measure the amount of water flowing. The in-line flow gauge may be located in the supply line of the water storage reservoir 101. In various embodiments, the size of the water storage reservoir 101 is between about 100 gallons and about 500 gallons. In some embodiments, the size of the water storage reservoir 101 is between about 100 gallons and about 200 gallons. In some instances, the size of the water storage reservoir 101 is about 150 gallons and the water storage reservoir 101 made of ultraviolet resistant high-density polyethylene. The water storage reservoir 101 may have an access lid for easy access and be configured to be completely drainable.

In various embodiments, the water storage reservoir 101, fluid pump 109, chemical storage reservoir 105, and chemical injection system 108 are mounted on a vehicle. In some embodiments, the water storage reservoir 101, fluid pump 109, chemical storage reservoir 105, and chemical injection system 108 are mounted on a skid sprayer platform that can be quickly place on vehicle using rollers or mounted to the bed of the vehicle. The vehicle may be a pickup truck, boat, trailer, golf cart, All-Terrain Vehicle (ATV), and the like. In some embodiments, the water storage reservoir 101, fluid pump 109, chemical storage reservoir 105, and chemical injection system 108 are configured to be mounted on a backpack carried by a user.

In some embodiments, the water is municipal water, which might be contaminated at construction sites, and the like. In various embodiments, a filtration system comprising one or more filters is used with the chemical spraying system 100. These filters may be instead of, or in addition to, one or more filters within the actual chemical injection system 108. For example, there may be a filter on the hydrant line before the water gets to the water storage reservoir 101 and/or a filter basket in the top of the water storage reservoir 101. There can also be a course filter and a fine filter before the fluid pump 109. These filter(s) alone or in combination protect the spray tips, hoses, fitting, and the fluid pump 109 from clogging with debris or being damaged by debris and unwanted impurities from the water such as sediment and hardness. In some embodiments, the chemical spraying system 100 further comprises a water softener to remove high concentrations of calcium and magnesium.

Another advantage of the chemical injection system 108 configurations of FIG. 2 through FIG. 7 that these configurations do not rely on one or more additional or auxiliary fluid pumps to ensure the steady and constant flow of chemical(s) from the chemical storage reservoir 105 because of the use of the Venturi injector(s) 202.

When a fluid, such as water, flows through the Venturi injector 202 having a varying diameter the compression and expansion of the fluid causes pressure inside the Venturi injector 202 to change. Specifically, when a fluid flows from a tube with a larger cross-section area ($A_1$) into a tube with a smaller cross-section area ($A_2$), the pressure ($P_2$) in the smaller cross-section area decreases and the velocity ($V_2$) increases with respect the pressure ($P_1$) and velocity ($V_1$) in the larger cross-section area ($A_1$). That is, as the fluid velocity in the Venturi injector 202 is increased there is a consequential drop in pressure. Thus, at the Venturi injector port, the pressure of the fluid is less than at the Venturi input port and the Venturi output port. This differential pressure can be used to cause a fluid to be sucked into the Venturi injector 202 at the Venturi injector port. That is, the flow of water through the hourglass shaped tube will create a region of low pressure (Venturi effect) within which the Venturi injector port is located. This region of low pressure produces suction which draws the chemical out of the Venturi injector port, without the need for an auxiliary pump, into the flow of the carrier fluid.

In some embodiments, this fluid flow is used to suck the liquid chemical into the carrier fluid where the liquid chemical and the carrier fluid are mixed effectively diluting the liquid chemical. The walls of the Venturi housing in the region of the Venturi input port form a shape of a narrowing cone or funnel. The walls of the Venturi housing in the region of the Venturi output port form a shape of an expanding cone or funnel. The walls of the Venturi housing in the region of the Venturi injector port couple the narrow housing end of the Venturi input port and the narrow housing start of the Venturi input port and in some embodiments form region having a shape of a tube of substantially constant diameter. The housing walls of the Venturi input port, the housing walls of the region local to the Venturi injector port, and housing walls of the Venturi output port collectively form a shape that is somewhat similar to that of a traditional hourglass. In some embodiments, the shape of the hourglass may be a parabolic shape.

In various embodiments, the orientation of Venturi injector 202 is substantial horizontal. The substantially horizontal orientation of the Venturi injector 202 prevents gravity pulling carrier fluid through the Venturi injector 202 creating suction at Venturi injector port when the fluid pump 109 is off. In some embodiments, the Venturi injector 202 can be located at a significant distance from the spray wand 114. Locating the Venturi injector 202 at a distance from the spray wand 114 prevents the orientation of the spray wand 114 from pulling carrier fluid through the Venturi injector 202 at a flow rate that is based on, at least in part, gravity, a length of a high-pressure line, a diameter of the high-pressure line, and the orientation of the nozzle which in the case of a hand-held pressure gun will vary.

In various embodiments, the Venturi injector 202 is located at the near-end of a length of high-pressure line and the spray wand 114 is located at the far-end of the length of high-pressure line. Depending on the applications the length of the high-pressure line can be between 30 feet and 200 feet. In some embodiments, the length of the high-pressure line is about 50 feet. Positioning the Venturi injector 202 at the near end of the length of high-pressure line allows the orientation of Venturi injector 202 to be fixed, thereby prevent any orientation of the nozzle tip modifying the fluid flow through the Venturi injector 202 and the suction at the Venturi injector port from varying. Locating the Venturi injector 202 at a significant distance from the nozzle tip allows the orientation of the Venturi injector to remain stable even when the orientation of the nozzle tip is varying.

In some embodiments, the Venturi injector 202 is located upstream before the fluid pump 109 to ensure a steady flow of carrier fluid into the chemical injection system 108 and the nozzle tip. In various embodiments, the Venturi injector 202 is located on the suction line of the fluid pump 109, thereby ensuring that there is a steady flow of carrier fluid into the Venturi injector 202. The steady flow of carrier fluid into the fluid pump 109 creates a steady vacuum pressure on the suction line and ensures a proper Venturi effect is obtained. That is, the proposed chemical injection system 108 configurations of FIG. 2 through FIG. 7 rely on the Venturi effect and the suction generated by a single fluid pump to ensure the steady and constant and flow of the chemical.

In various embodiments, a single Venturi injector port is located within the Venturi effect region between the two cones forming the Venturi injector inlet port and the Venturi outlet port. In some embodiments, a plurality of Venturi injector ports is located within the Venturi effect region. The plurality of Venturi injector ports can be configured to draw either a single liquid chemical into the stream of the carrier fluid at a higher flow rate, or a plurality of liquid chemicals into the stream of the carrier fluid at the same time.

In some embodiments, a single Venturi housing forms three Venturi injectors 202 coupled together in parallel. The three parallel Venturi injectors 202, comprising three Venturi input ports, three Venturi output ports, and three Venturi injector ports, one in each of the Venturi injectors 202. In practice, any number of parallel Venturi injectors 202 may be formed with a single Venturi housing. In some embodiments, a plurality of Venturi injectors 202 are circumferentially and evenly distributed about a central tube for the water bypass flow path.

In various embodiments, the chemical drawn into the carrier fluid at the Venturi injector port is thoroughly mixed into carrier fluid by the turbulent flow within the Venturi injector 202 and/or as the carrier fluid and chemical travel through the chemical spraying system 100. In some embodiments, the chemical injection system 108 includes one or more fluid baffles to mix the chemical and the carrier fluid. A baffle is anything that disturbs the flow of fluid. That is, a baffle changes the course of the fluid or redirects it. In various embodiments, groves or flights are added to an upstream portion and/or downstream portion of the Venturi injector 202 to create swirl, vortexes, and turbulent flow to thoroughly mix the water and the chemical. A vortex is a region in fluid in which the flow revolves around an axis line, which may be straight or curved.

In some embodiments, the chemical injection system 108 is configured to measure a pressure differential between the injector inlet and the injector port. For instance, a calibrated differential pressure sensor (not shown) may be fluidly coupled between the first injector inlet and the first injector port. The difference in pressure is a measure of the flow rate in the first longitudinal cavity of the Venturi injector 202.

Example Process

FIG. 8 is an example flow diagram of a process of injecting chemicals into a carrier fluid using the chemical injection system 108. In some embodiments, the process 800 begins with step 802, in which chemicals flow through a supply line from a chemical storage reservoir. In step 804, the chemicals enter a needle valve that allows for the flow control of the chemical. In step 806, an in-line flow gauge is used to measure the amount of chemical that is flowing through the supply line. In step 808, the chemical flows through a safety shutoff valve and into the Venturi injector port. In step 810, the chemical mixes with the water flowing out of the Venturi injector. In step 812, the mixed chemical pass through a T-fitting mixing with the bypass flow from the pressure regulators. This step is not required for demand style pumps. In Step 814, the mixture enters the intake side of the fluid pump, where the mixture contains to be mixed. In Step 816, the completely mixed solution exits the pump and enters the regulator. This step is required only in by-pass systems. In step 818, the mixed solution is discharged through a spray gun boom or the like. In step 820, when using a bypass system the bypass hose returns to the T-fitting at the pump intake side. In step 822, when the operator stops discharging the mixture the chemical stops mixing until the operator starts discharging when mixing resumes. In step 824, an optional chemical storage tank may use a bypass pump to keep the chemical solution suspension. This step may be required with high viscosity chemicals that require dilution or for the use of wettable powders.

While the chemical injection systems 108 of FIG. 2 through FIG. 7 have been described chemical injector system configurations using one or more Venturi injectors 202 it will become apparent to a person skilled in the art upon reading this disclosure that many of the advantages of the described chemical injector system configurations could be achieved by replacing one or more of the Venturi injectors 202 with a more conventional T-fitting.

The chemical injection systems 108 of FIG. 2 through FIG. 7 can be integrated into any demand or bypass pump system. The chemical injection systems 108 of FIG. 2 through FIG. 7 can also be integrated into gas powered and electric powered pump systems. The injection and mixing of multiple liquid chemicals can be achieved through either series or parallel configurations. Further the size and/or number of Venturi injector(s) 202 can be scaled up or down based on the demand flow rate of the chemical injection system 108. In some embodiments, a carrier fluid bypass path is integrated into the chemical injection system 108. In various embodiments, the carrier fluid bypass path is used to ensure that the correct fluid pump 109 intake flow rate is maintained. In various embodiments, use of a carrier fluid bypass path also ensures that the vacuum pressure in the chemical injection system 108 does not cause flow lines, for example the chemical injection flow lines and the like, to collapse.

Some of the advantages of the proposed chemical injector systems 108 are that they are scalable. Multiple venturi injectors 202 can be used in series and/or parallel to facilitate mixing multiple chemicals. The proposed chemical injector systems 108 allow real time adjustment of the chemical/water ratio to achieve the desired chemical to area mixing ratio. Chemical solutions can be mixed at any desired ratio within the limits of the resolution of the chemical flow gauge 107. The proposed chemical injector systems 108 can be utilized with any water storage reservoir tank size and fluid pump system, including but limited to by-pass and demand systems. The proposed chemical injection systems 108 work across a wide range of pressures and a wide range of flow rates. The proposed chemical injector systems 108 can work with a wide range of power systems. The user can quickly change the chemical being applied with minimum chemical being wasted. Loading and changing chemical is a less hazardous and more environmentally friendly operation.

Another advantage of the proposed chemical injector systems 108 is that the Venturi injector 202 has no moving parts and the vacuum at the Venturi injection port is proportional to flow rate of the carrier fluid. A Venturi injector 202 can be made by simply reducing the diameter of a tube to create a restriction or choke point for the carrier fluid to flow through. The restriction causes a corresponding localized reduction in pressure creating a Venturi Effect.

Another advantage of the chemical injection system 108 configurations of FIG. 2 through FIG. 7 is that these configurations do not need processors and/or sophisticated sensors, servo-controlled pumps, flow sensors, feedback systems, and the like to ensure a steady and consistent delivery of mixed and diluted chemical solutions. The chemical injection systems 108 of FIG. 2 through FIG. 7 are completely manual using only manual valves and pressure differences within the chemical injection system 108 to ensure a steady and constant flow of mixed and diluted chemical solutions.

While preferred embodiments of the present invention have been shown and described herein, it will be obvious to those skilled in the art that such embodiments are provided by way of example only. Numerous variations, changes, and substitutions will now occur to those skilled in the art without departing from the invention, in accordance with the claims. It should be understood that various alternatives to the embodiments of the invention described herein may be employed in practicing the invention.

What is claimed is:

1. A chemical injection system comprising:
   a first Venturi injector having a first injector housing;
   wherein the first injector housing comprises a first longitudinal cavity with a shape of a first hourglass, and wherein a first end of the first longitudinal cavity forms a first injector inlet and a second end of the first longitudinal cavity forms a first injector outlet, and
   wherein the first injector housing comprises a first vertical cavity located at a constriction in the shape of the first hourglass, the first vertical cavity forming a first injector port, and
   wherein the first injector inlet, the first injector outlet, and the first injector port are fluidly coupled,
   a second Venturi injector having a first injector housing;
   wherein the second injector housing comprises a second longitudinal cavity with a shape of a second hourglass, and wherein a first end of the second longitudinal cavity forms a second injector inlet and a second end of the second longitudinal cavity forms a second injector outlet, and
   wherein the second injector housing comprises a second vertical cavity
   located at a constriction in the shape of the second hourglass, the second vertical cavity forming a second injector port, and wherein the second injector port, the second injector inlet, and the second injector outlet are fluidly coupled;
   a first valve fluidly coupled to the first injector port and a second valve fluidly connected to the second injector port;
   a first chemical needle valve fluidly coupled to the first injector port and an in-line chemical flow gauge fluidly coupled between the first chemical needle valve and the first injector port, the in-line chemical flow gauge being configured to measure a rate of chemical flow and the first chemical needle valve being adjustable to regulate the chemical flow to a target value indicated by the in-line chemical flow gauge;
   wherein a change in carrier-fluid flow through a Venturi injector produces a corresponding and proportional change in suction at the respective injector port that is instantaneously visible on the in-line chemical flow gauge, enabling near-instant adjustment of the first chemical needle valve to maintain a precise micro-flow chemical injection rate;
   a first T-filter comprising a first T-filter input and a first T-filter output; and a second T-filter comprising a second T-filter input and a second T-filer output, wherein the first injector outlet is fluidly coupled to the first T-filter input,
   wherein the first injector outlet is fluidly coupled to the first T-filter input, the second injector outlet is fluidly coupled to the second T-filter input, and the first T-filter output is fluidly coupled to the second injector inlet to place the first Venturi injector and the second Venturi injector in series;
   and further comprising a primary reservoir, a pump having a pump input fluidly coupled to the primary reservoir and a pump output fluidly coupled to the first injector inlet, wherein the pump is an on-demand diaphragm pump;
   and wherein the primary reservoir, the pump, a chemical storage reservoir, and the chemical injection system are mounted on a portable platform selected from a vehicle-mounted skid or a backpack, to provide a compact, self-contained, and easily transportable system.

2. The chemical injection system of claim 1, further comprising a bypass inlet fluidly coupled to the first injector inlet and a bypass outlet fluidly coupled to the second T-filter output.

3. The chemical injection system of claim 2, further comprising a secondary reservoir fluidly coupled to an input of the first valve, wherein the second reservoir is smaller than the primary reservoir and stores a chemical, and wherein a Venturi effect draws the chemical through the first valve and the first injector port.

4. The chemical injection system of claim 2, wherein the primary reservoir of water is not contaminated by the chemical when a spray nozzle fluidly coupled to the second T-filter output operates at a reduced pressure.

5. The chemical injection system of claim 3, wherein the Venturi effect draws the chemical through the first injector port at between 0.1 ounce per minute and 25 ounces per minute when the first valve is in an open position.

6. The chemical injection system of claim 5, wherein a drop in pressure between a pressure at the first injector inlet and a pressure at the first injector port is a measure of a flow rate in the first longitudinal cavity.

* * * * *